United States Patent [19]

Sullivan et al.

[11] Patent Number: 4,803,059

[45] Date of Patent: Feb. 7, 1989

[54] PROCESS FOR THE REDUCTION OF NITROGEN OXIDES IN AN EFFLUENT USING A HYDROXY AMINO HYDROCARBON

[75] Inventors: James C. Sullivan, Southport; William R. Epperly, New Canaan, both of Conn.

[73] Assignee: Fuel Tech, Inc., Stamford, Conn.

[21] Appl. No.: 39,013

[22] Filed: Apr. 15, 1987

[51] Int. Cl.$^4$ ............................................. C01B 21/00
[52] U.S. Cl. ..................................................... 423/235
[58] Field of Search .................. 423/235, 235 D, 239, 423/239 A

[56] References Cited

U.S. PATENT DOCUMENTS

| | | | |
|---|---|---|---|
| 3,801,696 | 4/1974 | Mark | 423/212 |
| 3,846,981 | 11/1974 | Paczkowski | 60/286 |
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,507,269 | 3/1985 | Dean et al. | 423/235 |
| 4,624,840 | 11/1988 | Dean et al. | 423/235 |

FOREIGN PATENT DOCUMENTS

| | | |
|---|---|---|
| 2630202 | 2/1977 | Fed. Rep. of Germany . |
| 51-76166 | 1/1976 | Japan ................................... 423/235 |
| 5067609 | 12/1976 | Japan . |
| 52-85056 | 7/1977 | Japan ................................... 423/235 |
| 511138 | 7/1977 | Japan . |
| 1514588 | 7/1977 | Japan . |
| 5112330 | 8/1977 | Japan . |
| 5189176 | 2/1978 | Japan . |
| 54-123573 | 3/1978 | Japan . |

*Primary Examiner*—Gregory A. Heller
*Attorney, Agent, or Firm*—St. Onge, Steward, Johnston & Reens

[57] ABSTRACT

A process for the reduction of the concentration of nitrogen oxides is in effluent from the combustion of a carbonaceous fuel is presented. The process comprises injecting a treatment agent comprising a hydroxy amino hydrocarbon into an effluent at an effluent temperature of greater than about 1300° F. under conditions effective to reduce the concentration of nitrogen oxides in the effluent.

23 Claims, No Drawings

PROCESS FOR THE REDUCTION OF NITROGEN OXIDES IN AN EFFLUENT USING A HYDROXY AMINO HYDROCARBON

TECHNICAL FIELD

The present invention relates to a process for the reduction of the concentration of nitrogen oxides ($NO_x$) in an effluent, especially an oxygen-rich effluent, from the combustion of a carbonaceous fuel. The process comprises injecting into the effluent a treatment agent comprising a hydroxy amino hydrocarbon, wherein the effluent temperature is greater than about 1300° F.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used to fire large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides.

Nitrogen oxides, especially $NO_2$, are troublesome pollutants which are found in the combustion effluent streams of large utility boilers when fired as described above, and comprise a major irritant in smog. It is further believed that nitrogen oxides can undergo a process known as photo-chemical smog formation, through a series of reactions in the presence of sunlight and hydrocarbons. Moreover, nitrogen oxides is a principal contributor to acid rain.

Unfortunately, the temperatures within a utility boiler render most common methods of reducing $NO_x$ concentrations, such as effluent scrubbing or catalyst grids, either uneconomical, infeasible, or both.

BACKGROUND ART

Many different processes and combinations have been proposed for the reduction of nitrogen oxides in an effluent, each succeeding one providing improved $NO_x$ reductions. For instance, Arand et al., U.S. Pat. No. 4,208,386, disclose a method for reducing $NO_x$ in combustion effluents by injecting urea, either as a solid powder or in solution, at effluent temperatures in excess of 1300° F. The preferred urea solutions are those having at least 10 weight percent urea. For operation at temperatures below 1600° F., the use of reducing materials such as paraffinic, olefinic, aromatic and oxygenated hydrocarbons, as well as hydrogen, are required.

Bowers, in copending and commonly assigned U.S. patent application Ser. No. 906,671, filed Sept. 10, 1986, discloses the use of a solution which comprises urea and hexamethylenetetramine (HMTA) to reduce the $NO_x$ concentration in oxygen-rich effluents having temperatures above 1300° F. Similarly, Bowers, in copending and commonly assigned U.S. patent application Ser. No. 784,828, filed Oct. 4, 1985, discloses a solution comprising urea and an oxygenated hydrocarbon solvent which is disclosed as being effective at reducing $NO_x$ concentrations with reduced ammonia slippage in effluents at temperatures above 1600° F.

In copending and commonly assigned U.S. patent application entitled "Process for Reducing Nitrogen Oxides in an Effluent Using a Hydrocarbon or Hydrogen Peroxide" having Ser. No. 022,799, filed Mar. 6, 1987, Sullivan discloses the use of hydrocarbons to reduce $NO_x$ levels in effluents at low temperatures (i.e., below 1450° F., especially below 1300° F.).

Although the prior art processes for reducing nitrogen oxides concentrations are generally effective, there exists a present need for a process which elicits still further $NO_x$ reductions in an economical and convenient manner.

DISCLOSURE OF INVENTION

This invention relates to the reduction of the concentration of nitrogen oxides in an effluent from the combination of a carbonaceous fuel. More particularly, this invention relates to a process wherein a treatment agent comprising a hydroxy amino hydrocarbon is injected into an effluent from the combustion of a carbonaceous fuel at a location where the effluent is at a temperature of greater than about 1300° F., preferably greater than about 1450° F. The temperature of the effluent can be as high as about 2000° F. for operability according to this invention.

Suitable hydroxy amino hydrocarbons for the practice of this invention include alkanolamines having primary, secondary or tertiary amines such as monoethanolamine (also referred to as ethanolamine); amino acids such as glycine; and protein-containing compositions such as milk, whey, powdered milk, skimmed milk, blood plasma, and other proteinaceous food plant and animal wastes; and mixtures thereof.

Most preferably, the treatment agent of this invention further comprises urea. The term "urea" as employed in this description includes the compound urea itself, as well as compounds equivalent in effect. Thus, unless otherwise specified, reference in this disclosure to urea should not be taken as limiting to urea itself but should extend to urea and all of its equivalents. It is pointed out that the term equivalent is not limited to exact equivalents, and various equivalents will be optimally operable at some conditions which are different than those for other equivalents. Moreover, some of the equivalents may be more effective at the reduction of nitrogen oxides concentration than others.

The term "hydroxy amino hydrocarbon", as used herein, refers to any cyclic, heterocyclic, aromatic, straight or branched chain, substituted or unsubstituted hydrocarbon having at least one substituent comprising a hydroxy or a carboxy group and at least one primary, secondary or tertiary amino group. Exemplary of hydroxy amino hydrocarbons suitable for use in the present invention are those having the general formula

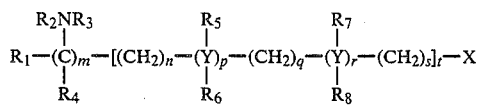

wherein Y is nitrogen, oxygen, sulfur or carbon; X is carboxyl or

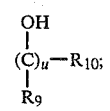

$R_1$ and $R_{10}$ are, independently, any of hydrogen, alkyl, alkenyl, carboxyl, acyl, aryl, amino, carbonyl, hydroxyl, alkoxyalkyl, hydroxyalkyl, thiohydroxyalkyl and alkoxy, or combinations of more than one; $R_2$ and $R_3$ are, independently, any of hydrogen, aryl, alkyl, alkenyl, alkoxyalkyl, hydroxyalkyl and alkoxy, or combinations of more than one; $R_4$–$R_9$, if present, are, independently, any of hydrogen, alkyl, alkenyl, acyl, aryl, amino, carboxyl, hydroxyl, alkoxyalkyl, hydroxyalkyl, thiohydroxyalkyl and alkoxy, or combinations of more than one; m and u are each independently 0 or an integer, provided that when m is 0, one of $R_1$ or $R_5$–$R_{10}$ is an amino group and when u is 0, one of $R_1$–$R_8$ or $R_{10}$ is a hydroxyl group; n, p, q, r, s and t are each independently 0 or an integer. Alternatively, $R_1$ and $R_{10}$ comprise a covalent bond, thereby forming a cyclic compound having the general formula

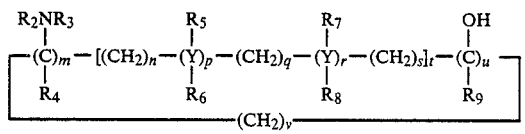

wherein Y is nitrogen, oxygen, sulfur or carbon; $R_2$ and $R_3$ are, independently, any of hydrogen, alkyl, alkenyl, alkoxyalkyl, hydroxyalkyl and alkoxy, or combinations of more than one; $R_4$–$R_9$, if present, are, independently, any of hydrogen, alkyl, alkenyl, acyl, aryl, amino, hydroxyl, carboxyl, alkoxyalkyl, hydroxyalkyl, thiohydroxyalkyl and alkoxy, or combinations of more than one; m and u are each independently 0 or an integer, provided that when m is 0, one of $R_5$–$R_9$ is an amino group and when u is 0, one of $R_2$–$R_8$ is a hydroxyl group; n, p, q, r, s, t and v are each independently 0 or an integer; or any two of $R_2$–$R_9$ are, independently, any of alkenyl, amino, carbonyl, hydroxyl, carboxyl, alkoxyalkyl, hydroxyalkyl, thiohydroxyalkyl and alkoxy, or combinations of more than one, and are joined through a covalent bond to form a cyclic compound.

For instance, when $R_1$–$R_4$, $R_9$ and $R_{10}$ are each hydrogen; X is

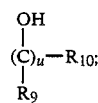

m and u are each 1; and t is 0, the compound is monoethanolamine; when $R_1$–$R_4$ are each hydrogen; X is carboxyl; m is 1; and t is 0, the compound is glycine; when $R_1$ and $R_4$ are each hydrogen; $R_2$ and $R_3$ are each hydroxyethyl; X is

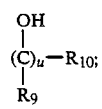

$R_9$ and $R_{10}$ are each hydrogen; m and u are each 1; and t is 0, the compound is triethanolamine; when $R_1$ is methyl; $R_2$–$R_4$ are each hydrogen; X is carboxyl; m is 1; and t is 0, the compound is alanine; when $R_1$–$R_4$ are each hydrogen; X is

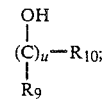

$R_9$ and $R_{10}$ are each hydrogen; m, n, t and u are each 1; and p, q, r and s are each 0, the compound is propanolamine.

It is understood that included in the above-described general formula, which is exemplary of hydroxy amino hydrocarbons according to this invention, are polymerization and condensation products thereof, such as proteins.

As used herein, the term "alkyl" refers to a straight or branched chain hydrocarbon containing no unsaturation, e.g., methyl, ethyl, isopropyl, 2-butyl, neopentyl, n-hexyl, etc.; the term "lower" means the group to which it refers contains from 1 to 6 carbon atoms; the term "alkoxy" refers to a univalent radical composed of an alkyl group linked through an oxygen atom having its free valence bond therefrom, e.g., methoxy (—O—CH$_3$), ethoxy (—O—CH$_2$—CH$_3$), etc.; the term "acyl" refers to a carboxyl group in which the hydroxyl group has been replaced with another radical, such as alkyl, aryl, etc., e.g., acetyl

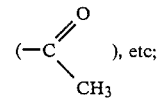

the term "aryl" refers to an aromatic hydrocarbon containing no unsaturation, e.g., phenyl, benzyl, naphthyl, etc.; the term "carboxyl" refers to a univalent radical composed of a carbonyl group and a hydroxyl group linked through a carbon atom having its free valence bond therefrom, e.g.,

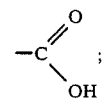

the term "carbonyl" refers to a bivalent radical having the formula

the term "hydroxyl" refers to the univalent group —OH which is characteristic of alcohols; the term "hydroxyalkyl" refers to an alkyl group having at least one hydrogen substituted with a hydroxyl group; the term "alkoxyalkyl" refers to an alkyl group having at least one hydrogen substituted with an alkoxy group; the term "thiohydroxyalkyl" refers to a hydroxyalkyl group wherein the oxygen of the hydroxyl group is replaced with sulfur; and the term "alkenyl" refers to an unsaturated radical of the lower branched or unbranched alkyl groups it is derived from, having at least one double bond therein.

As used herein, the term "amino acid" refers to any organic acid in which at least a portion of the nonacid hydrogen has been replaced by one or more amino groups and which therefore shows both basic and acidic properties; the term "alkanolamine" refers to a compound in which nitrogen is attached directly to the carbon of an alkyl alcohol; the term "amino" refers to the group $NH_2$ wherein one or both hydrogens may be substituted with a lower alkyl; the term "protein" refers to any polymeric compound having amino acids as the basic structural unit, preferably refers to water dispersible proteins, most preferably water soluble proteins, protein fractions and hydrosylates, and is also understood to include vegetable proteins such as soy protein and animal proteins such as those derived from milk and blood plasma; the term "skimmed milk" refers to milk having some or all of the fat removed; the term "powdered milk" refers to non-fat dry milk, available commercially as Carnation Instant Non-Fat Dry Milk from the Carnation Company of Los Angeles, Calif. It will be understood that milk derivatives such as casein and whey are included in the definitions of skimmed milk and powdered milk.

Advantageously, the treatment agent of this invention is injected into the effluent in solution or as a dispersion or mixture in a suitable solvent. Water is a preferred solvent due to the economy of aqueous solutions, dispersions and mixtures and the fact that they can be employed with suitable effectiveness in most situations. For ease of description, the term "mixture" will be used to denote mixtures, dispersions and solutions. The effective mixture comprising the treatment agent of this invention will range from saturated to dilute. While water is an effective solvent for most applications, it will be recognized that there may be instances where other solvents may be advantageously used, either alone or in combination with water, as would be known to the skilled artisan.

The level of hydroxy amino hydrocarbon present in the mixture is advantageously in the range of about 0.5% to about 25% by weight, preferably about 5% to about 15% by weight. Where urea is employed in the treatment agent, it should preferably be present in the mixture in the range of about 2% to about 60%, most preferably about 5% to about 30% by weight. The weight ratio of hydroxy amino hydrocarbon to urea, when urea is used with the hydroxy amino hydrocarbon as the treatment agent in mixture, should advantageously be about 1:10 to about 4:1, more preferably about 1:5 to about 3:1. The most preferred weight ratio of hydroxy amino hydrocarbon to urea in the mixture is about 1:4 to about 2.5:1.

The temperature of the effluent at the point of injection will have an influence on the concentration of the mixture. At temperatures of about 1300° F. to about 1700° F., the mixture will tend to operate effectively at high concentration, e.g., about 10% to about 65% by weight treatment agent. On the other hand, at temperatures in excess of about 1700° F., the solution will tend more towards dilute. At these higher temperatures, water (or the solvent in case of non-aqueous solutions) may comprise greater than 80%, 85% or even 90% by weight of the solution.

The treatment agent of this invention is preferably injected into the effluent in an amount effective to elicit a reduction in the nitrogen oxides concentration in the effluent. Advantageously, the treatment agent of this invention is injected into the effluent in an amount sufficient to provide a molar ratio of the nitrogen contained in the treatment agent to the baseline nitrogen oxides level of about 1:5 to about 10:1. More preferably, the treatment agent is injected into the effluent to provide a molar ratio of treatment agent nitrogen to baseline nitrogen oxides level of about 1:3 to about 5:1, most preferably about 1:2 to about 3:1.

The treatment agent injection ratio can alternatively be expressed as the normalized stoichiometric ratio (NSR) of the treatment agent to the baseline nitrogen oxides level. Normalized stoichiometric ratio is the ratio of the concentration of $NH_x$ radicals ($NH_x$ radicals, with x being an integer, are believed to be the moiety contributed by the treatment agent which facilitates the series of reactions resulting in $NO_x$ breakdown) to the concentration of nitrogen oxides in the effluent and can be expressed as $[NH_x]/[NO_x]$.

The treatment agent, whether in a mixture or injected in pure form, is preferably injected into the effluent gas stream at a point where the effluent is at a temperature above about 1300° F., more preferably above about 1400° F. and most preferably above about 1450° F. Large industrial and circulating fluidized bed boilers of the types employed for utility power plants and other large facilities will typically have access only at limited points. In the most typical situations, the boiler interior in the area above the flame operates at temperatures which at full load exceed 2000° F. After subsequent heat exchange, the temperature will be lower, usually in the range between about 1300° F. and about 1900° F. At these temperatures, the treatment agent of this invention can be effectively introduced to accomplish substantial reduction of nitrogen oxides in the effluent.

The treatment agent utilized according to this invention is preferably injected at a number of spaced positions from nozzles or other apparatus which are effective to uniformly distribute the treatment agent through the combustion effluent.

The effluent into which the treatment agent of this invention is injected is preferably oxygen-rich, meaning that there is an excess of oxygen in the effluent. Advantageously, the excess of oxygen is greater than about 1% by volume. Most preferably, the excess of oxygen is in the range of about 1% to about 12% or greater by volume.

It will be understood that the $NO_x$ reducing treatment agents of this invention are useful not only where substantial nitrogen oxides reductions are accomplished by directly applying the disclosed method as the principal $NO_x$ reducing method, but can also be employed as a discrete step in combination with other chemical, catalytic or other procedures for reducing nitrogen oxides concentrations as well as other pollutants such as sulfur dioxide ($SO_2$), while preferably controlling levels of residual pollutants such as ammonia and/or carbon monoxide Such a suitable "multi-step" process is disclosed in copending and commonly assigned U.S. patent application entitled "Multi-Stage Process for Reducing the Concentration of Pollutants in an Effluent" having Ser. No. 022,716, filed in the names of Epperly, Peter-Hoblyn, Shulof and Sullivan on Mar. 6, 1987, the disclosure of which is incorporated herein by reference.

A surprising and advantageous aspect of the practice of this invention is in the reduced production of other pollutants, such as ammonia and carbon monoxide, during the nitrogen oxides reduction process. The presence of ammonia in the effluent should be avoided because, among other reasons, it can react with $SO_3^=$ to form ammonium bisulfate which can foul heat exchange surfaces in a boiler. Moreover, ammonia has detrimental effects on ambient air quality, as has carbon monoxide. The reason for the lower levels of ammonia and carbon monoxide is not fully understood but is probably because the series of reactions involving the hydroxy amino hydrocarbons, urea and NO$_x$ which lead to the reduction of NO$_x$ concentrations simply does not produce substantial amounts of other pollutants as by-products.

BEST MODE FOR CARRYING OUT THE INVENTION

The following example describes the reduction of nitrogen oxides in an effluent through use of the present invention. Unless otherwise indicated, all parts and percentages are based on the weight of the composition at the particular point of reference.

EXAMPLE I

The burner used in the examples is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are injected is measured at the point of injection utilizing a K-type thermocouple. Atomizing injectors described in copending U.S. patent application entitled "Process and Apparatus for Reducing the Concentration of Pollutants in an Effluent" having Ser. No. 009,696, filed in the name of Burton on Feb. 2, 1987, the disclosure of which is incorporated herein by reference, are positioned through ports in the effluent flue conduit in order to introduce and distribute the treatment agents into the effluent stream. The treatment agents are injected into the effluent at a rate of 300 ml/hr. The burner fuel is a Number 2 fuel oil, and the burner is fired at a rate of 8.7 to 9.6 lbs/hr.

A baseline nitrogen oxides concentration reading is taken prior to beginning each run and a final nitrogen oxides reading is taken during injection of the treatment agents to calculate the reduction in the nitrogen oxides concentration in the effluent elicited by each of the agents injected.

The following runs are made:
1. a 15% by weight aqueous solution of monoethanolamine is injected into the effluent at an effluent temperature of 1695° F. and an excess of oxygen of 2.8% by volume.
2. A 15% by weight aqueous solution of glycine is injected into the effluent at an effluent temperature of 1335° F. and an excess of oxygen of 3.2% by volume.
3. A 15% by weight aqueous solution of glycine is injected into the effluent at an effluent temperature of 1700° F. and an excess of oxygen of 2.9% by volume.

The results are shown in Table I:

TABLE I

| Run | NO$_x$ Bef. (ppm) | No$_x$ During (ppm) | % Red. |
|---|---|---|---|
| 1 | 165 | 102 | 38.2 |
| 2 | 132 | 89 | 32.6 |

TABLE I-continued

| Run | NO$_x$ Bef. (ppm) | No$_x$ During (ppm) | % Red. |
|---|---|---|---|
| 3 | 165 | 112 | 32.1 |

EXAMPLE II

Treatment agents are injected into a combustion tunnel under conditions as described above for Example I, except that the burner is fired at a rate of 8.7 to 9.6 lbs of fuel/hr.

The following runs are made:
1. An aqueous solution comprising 10% by weight of urea, 15% by weight of monoethanolamine and 0.1% by weight of a commercially available surfactant is injected into the effluent at a temperature of 1660° F. and a 3.1% by volume excess of oxygen.
2. An aqueous solution comprising 10% by weight of urea, 15% by weight of glycine and 0.1% by weight of a commercially available surfactant is injected into the effluent at a temperature of 1680° F. and a 3.1% by volume excess of oxygen.
3. An aqueous solution comprising 10% by weight of urea, 15% by weight of powdered milk and 0.1% by weight of a commercially available surfactant is injected into the effluent at a temperature of 1680° F. and a 2.6% by volume excess of oxygen.
4. An aqueous solution comprising 10% by weight of urea, 15% by weight of powdered milk and 0.1% by weight of a commercially available surfactant is injected into the effluent at a temperature of 1560° F. and a 3.4% by volume excess of oxygen.

The results are shown in Table II:

TABLE II

| Run | NO$_x$ Bef. (ppm) | NO$_x$ During (ppm) | % Red. | NH$_3$ (ppm) | CO (ppm) |
|---|---|---|---|---|---|
| 1 | 164 | 57 | 65.2 | 82 | 30 |
| 2 | 164 | 48 | 70.7 | 36 | 21 |
| 3 | 164 | 113 | 31.1 | 4 | 5 |
| 4 | 187 | 58 | 69.0 | 48 | 160 |

It is clear from the tables that by the practice of this invention, substantially improved reductions in the concentration of nitrogen oxides in the effluent of the combustion of a carbonaceous fuel can be elicited through the injection of a treatment agent comprising a hydroxy amino hydrocarbon according to this invention.

The above descriptions are for the purpose of teaching the person of ordinary skill in the art how to practice the present invention, and they are not intended to detail all of those obvious modifications and variations of it which will become apparent to the skilled worker upon reading the description. It is intended, however, that all such obvious modifications and variations be included within the scope of the present invention which is defined by the following claims.

We claim:
1. A process for the reduction of the concentration of nitrogen oxides in an effluent from the combustion of a carbonaceous fuel, the process comprising injecting a treatment agent comprising a hydroxy amino hydrocarbon into an effluent at an effluent temperature of greater than about 1300° F. under conditions effective to reduce the concentration of nitrogen oxides in the effluent.
2. The process of claim 1 wherein the effluent temperature is greater than about 1450° F.

3. The process of claim 1 wherein said hydroxy amino hydrocarbon is selected from the group consisting of alkanolamines, amino acids, protein-containing compositions and mixtures thereof.

4. The process of claim 3 wherein said hydroxy amino hydrocarbon comprises glycine.

5. The process of claim 1 wherein said treatment agent is injected into said effluent at a molar ratio of nitrogen in said treatment agent to the baseline nitrogen oxides level of about 1:5 to about 10:1.

6. The process of claim 5 wherein the molar ratio of the nitrogen in said treatment agent to the baseline nitrogen oxides level is about 1:3 to about 5:1.

7. The process of claim 6 wherein said treatment agent is injected into the effluent at a molar ratio of nitrogen in said treatment agent to the baseline nitrogen oxides level of about 1:2 to about 3:1.

8. The process of claim 1 wherein said treatment agent comprises an aqueous mixture.

9. The process of claim 1 wherein said treatment agent further comprises urea.

10. A process for reducing the concentration of nitrogen oxides in an effluent from the combustion of a carbonaceous fuel, the process comprising injecting a treatment agent which comprises urea and a hydroxy amino hydrocarbon into an effluent at an effluent temperature of greater than about 1300° F. under conditions effective to reduce the concentration of nitrogen oxides in the effluent.

11. The process of claim 10 wherein the effluent temperature is greater than about 1450° F.

12. The process of claim 11 wherein said hydroxy amino hydrocarbon is selected from the group consisting of alkanolamines, amino acids, protein-containing compositions and mixtures thereof.

13. The process of claim 12 wherein said hydroxy amino hydrocarbon comprises glycine.

14. The process of claim 11 wherein said treatment agent comprises an aqueous mixture.

15. The process of claim 11 wherein said treatment agent is injected into the effluent at a molar ratio of nitrogen in said treatment agent to the baseline nitrogen oxides level of about 1:5 to about 10:1.

16. The process of claim 15 wherein the molar ratio of nitrogen in said treatment agent to the baseline nitrogen oxides level is about 1:3 to about 5:1.

17. The process of claim 16 wherein the molar ratio of nitrogen in said treatment agent to the baseline nitrogen oxides level is about 1:2 to about 3:1.

18. A process for the reduction of the concentration of nitrogen oxides in an effluent from the combustion of a carbonaceous fuel, the process comprising:
   a. providing a treatment agent comprising urea and a hydroxy amino hydrocarbon at a weight ratio of hydroxy amino hydrocarbon to urea of about 1:10 to about 4:1;
   b. injecting said treatment agent into an effluent at an effluent temperature of greater than about 1450° F. and at a molar ratio of nitrogen in said treatment agent to the baseline nitrogen oxides level of about 1:5 to about 10:1;
under conditions effective to reduce the concentration of nitrogen oxides in the effluent.

19. A process for the reduction of the concentration of nitrogen oxides in an effluent from the combustion of a carbonaceous fuel, the process comprising injecting a treatment agent comprising urea and a hydroxy amino hydrocarbon into an effluent at an effluent temperature of greater than about 1300° F. and a weight ratio of hydroxy amino hydrocarbon to urea of about 1:10 to about 4:1, under conditions effective to reduce the concentration of nitrogen oxides in the effluent.

20. A process for the reduction of the concentration of nitrogen oxides in an effluent from the combustion of a carbonaceous fuel, the process comprising injecting a treatment agent comprising a hydroxy amino hydrocarbon and about 2% to about 60% by weight of urea into an effluent at an effluent temperature of greater than about 1450° F. under conditions effective to reduce the concentration of nitrogen oxides in the effluent.

21. The process of claim 20 wherein said treatment agent comprises an aqueous mixture comprising a hydroxy amino hydrocarbon and about 2% to about 60% by weight of urea.

22. A process for the reduction of the concentration of nitrogen oxides in an effluent from the combustion of a carbonaceous fuel, the process comprising injecting a treatment agent comprising urea and about 0.5% to about 25% by weight of a hydroxy amino hydrocarbon into an effluent at an effluent temperature of greater than about 1450° F. under conditions effective to reduce the concentration of nitrogen oxides in the effluent.

23. The process of claim 22 wherein said treatment agent comprises an aqueous mixture comprising urea and about 0.5% to about 25% by weight of a hydroxy amino hydrocarbon.

* * * * *